(12) United States Patent
Sue

(10) Patent No.: US 7,310,344 B1
(45) Date of Patent: Dec. 18, 2007

(54) METHOD AND SYSTEM FOR AN INSTANT MESSENGER HOME AUTOMATION SYSTEM INTERFACE USING A HOME ROUTER

(75) Inventor: John Ah Sue, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 972 days.

(21) Appl. No.: 10/040,699

(22) Filed: Dec. 28, 2001

(51) Int. Cl.
*H04L 12/28* (2006.01)
(52) U.S. Cl. ............................... 370/410; 709/217
(58) Field of Classification Search ............ None
See application file for complete search history.

(56) References Cited

U.S. PATENT DOCUMENTS

| | | | |
|---|---|---|---|
| 2002/0019725 A1* | 2/2002 | Petite | 702/188 |
| 2002/0069276 A1* | 6/2002 | Hino et al. | 709/223 |
| 2003/0106062 A1* | 6/2003 | Shteyn et al. | 725/78 |
| 2003/0117280 A1* | 6/2003 | Prehn | 340/540 |
| 2003/0200009 A1* | 10/2003 | von Kannewurff et al. | 700/275 |
| 2005/0198063 A1* | 9/2005 | Thomas et al. | 707/102 |
| 2006/0167985 A1* | 7/2006 | Albanese et al. | 709/203 |

OTHER PUBLICATIONS

U.S. Appl. No. 60/342,705.*

* cited by examiner

*Primary Examiner*—Huy D. Vu
*Assistant Examiner*—Rhonda Murphy
(74) *Attorney, Agent, or Firm*—Stolowitz Ford Cowger LLP

(57) ABSTRACT

A method for interfacing with a home automation system using a router. The router receives control signals from an instant messenger application via a communications network. The communications network can be the Internet. The router then transmits the control signal to at least one appliance to control the appliance in accordance with the control signal. A reply to the control signal can be received from the appliance and the reply can be transmitted to the instant messenger application regarding a status of the appliance. The control signals can be transmitted among the appliances in accordance with a standardized home automation interface. The router can be configured to interface with a plurality of appliances via a home automation system interface unit. The router can also be configured to log onto an instant messenger server and function as an instant messenger client to receive control signals from a user.

22 Claims, 4 Drawing Sheets

METHOD AND SYSTEM FOR AN INSTANT MESSENGER HOME AUTOMATION SYSTEM INTERFACE USING A HOME ROUTER

TECHNICAL FIELD

This invention relates to the field of remote interaction with a variety of electronically controlled systems and appliances. More particularly, the present invention relates to an improved, easy to use, remote interface method particularly suited for use in residential or commercial automation systems.

BACKGROUND ART

In recent years, both the number and variety of electronic devices and appliances in use have increased dramatically. Lighting systems, personal computers (PCs), video tape recorders, compact disc (CD) players, stereo receivers, and televisions are but a few of the most common devices found n both residential and commercial settings. Even appliances which rely on non-electric power sources, such as gas burning furnaces, are usually controlled electronically.

Reflecting the variety of devices now available, many different systems and devices are used to provide more centralized or automated control of the appliances found in the home and the office. These can be as simple as a remote-control entertainment system comprising a CD player, stereo and television, or as complex as a building environmental control system for regulating HVAC and security functions.

A central feature of any automation system is the interface by which the user interacts with the automation system. User interfaces permit one to program future operation or to control different devices from a centralized location. Reflecting the variety of appliances or devices that are to be controlled, user interfaces may range widely in complexity. In some settings, a more complicated interface is necessary to provide the broad range of functionality required. For example, a building control center may be sufficiently complicated to require training for the operator. On the other hand, in many environments, particular residential settings, it is essential that interfaces be easy to use and understand so that the entire range of functionality may be utilized.

Unfortunately, the standard approach now commonly used is for each device or system in a given environment to be controlled according to a particular methodology which might differ dramatically from other systems. For example, a home might include a security system, an entertainment system, an environmental control system, and so forth, each with its own unique interface. Thus, a user may be required to set a thermostat in a first manner, program a VTR in a different manner, and program the security system in yet a different manner. By requiring the user to learn several methods of operating each system or set of devices in the environment, it is more difficult for the user to become familiar with the various systems and to take full advantage of all their features.

Another drawback associated with this standard approach is that the use of different interfaces may result in an increase in the amount of space taken up in the setting. For example, two or more different keypad controllers may be mounted on a wall to separately control individual systems. As a result, there may be a decrease in available wall space and a negative impact on the aesthetic quality of the setting.

Some automation systems attempt to address these limitations through the use of menu driven interfaces which are connected to a single, dedicated control processor. With such a system, a user may control various systems, such as lighting, HVAC, and security, from a single type of interface which uses a common methodology for interacting with the user. In general, such interfaces incorporate a display, typically a cathode ray tube (CRT) or liquid crystal display (LCD), which provides the user with several options for controlling one or more systems in the setting.

The widespread adoption and use of desktop computer systems has made computer implemented graphical user interfaces (GUIs) the most predominant type of automation system interface. In a typical implementation, various devices to be controlled are represented as icons on a display screen. Different attributes and functions of the various devices, such as, for example, turning a light fixture on or off or setting the temperature of a thermostat, can be controlled by graphically manipulating the corresponding icons using a keyboard or mouse.

One alternative to a desktop computer system involves the use of a dedicated menu driven display device coupled to a processor. For example, a touch screen can be utilized wherein the user presses a portion of the display screen to make a selection. The user's finger touch is detected and the display indicates which area of the display has been selected. Alternatively, conventional mechanical switches may be provided in proximity to the display screen. A graphical image on the display device directs the user to the appropriate push-button flanking the display. This approach is similar to that adopted in connection with many automated teller machines (ATMs).

The use of desktop computer systems or dedicated touch screen type displays in accordance with the prior art presents several problems. In the case of touch screens, touchscreen hardware is relatively expensive and requires a somewhat substantial computer system platform to implement the control functionality (e.g., processor and memory elements). In the case of desktop computer systems, the controller applications written for such computer systems tend to be complex. Controller applications are often dedicated pieces of software written for a specific operating system. Such controller applications are typically not portable among different types of machines (e.g., PC compatible computers, Macintosh computers, palmtop computers, etc.), and thus, control of the automation system depends upon having access to the desktop computer system. An additional drawback is the fact that in order to control the automation system, the desktop computer system needs to be powered up. Thus, in cases where remote access is desired, the desktop computer system needs to remain on in order to respond to remote commands from a user (e.g., via modem, etc.).

Thus, what is required is a solution that provides an easy to use and easy to understand interface for controlling an automation system. The required solution should be device independent with respect to different types of computer systems. The required solution should function with standardized home automation system architectures. In addition, the required solution should provide for easy remote access and control of the functions of the automation system. The present invention provides a novel solution to these requirements.

DISCLOSURE OF THE INVENTION

Embodiments of the present invention are directed towards a method and system for an instant messenger home automation system interface using a router. Embodiments of the present invention provide an easy to use and easy to understand interface for controlling an automation system. The interface system of the present invention is device independent with respect to different types of computer systems. The embodiments of the present invention function with standardized home automation system architectures. In addition, embodiments of the present invention provide for easy remote access and control of the functions of the automation system.

In one embodiment, the present invention is implemented as a router based interfacing method for a home automation system. In this embodiment, the router receives control signals from an instant messenger application via a communications network (e.g., the Internet, Intranet, etc.). The router then transmits the control signal to at least one appliance (e.g., light fixture, alarm system, thermostat, etc.) to control the appliance in accordance with the control signal. A reply to the control signal can be received from the appliance and the reply can be transmitted to the instant messenger application regarding a status of the appliance (e.g., "front porch light is on", etc.). The control signals can be transmitted among the appliances in accordance with a standardized home automation interface. The router can be configured to interface with a plurality of appliances via a home automation system interface unit. The router can also be configured to log onto an instant messenger server and thereby function as an instant messenger client to receive control signals from a user.

In another embodiment, the present invention is implement as a router having an internal computer system platform for implementing the interface functionality in addition to conventional routing functions. In this embodiment, the router includes a network interface for communicating with a communications network (e.g., the Internet, intranet, etc.) and a home automation system interface for communicating with a home automation system. The router also includes a computer system for executing computer readable code, the code specifically written to implement the interfacing functionality. The router can be configured to log onto an instant messenger server and function as an instant messenger client to receive the control signals for the appliances. The router can also be configured to receive event signals from one or more appliances and transmit messages to the instant messenger application regarding the event signals. The router can also be configured to maintain a firewall and to securely transmit and receive messages to and from the instant messenger application through the firewall wall.

In this manner, the use of an instant messenger application and implementation of instant messenger functionality provides an easy to use and easy to understand interface for controlling an automation system. Instant messenger applications are device independent with respect to different types of computer systems (e.g., different desktop computer systems, different palmtop computer systems, cell phones, etc.). Additionally, the instant messenger functionality provides for easy remote access and control of the functions of the automation system.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Embodiments of the present invention are directed towards a method and system for an instant messenger home automation system interface using a router. Embodiments of the present invention provide an easy to use and easy to understand interface for controlling an automation system. The interface system of the present invention is device independent with respect to different types of computer systems. The embodiments of the present invention function with standardized home automation system architectures. In addition, embodiments of the present invention provide for easy remote access and control of the functions of the automation system. The present invention and its benefits are further described below.

Figure 1:
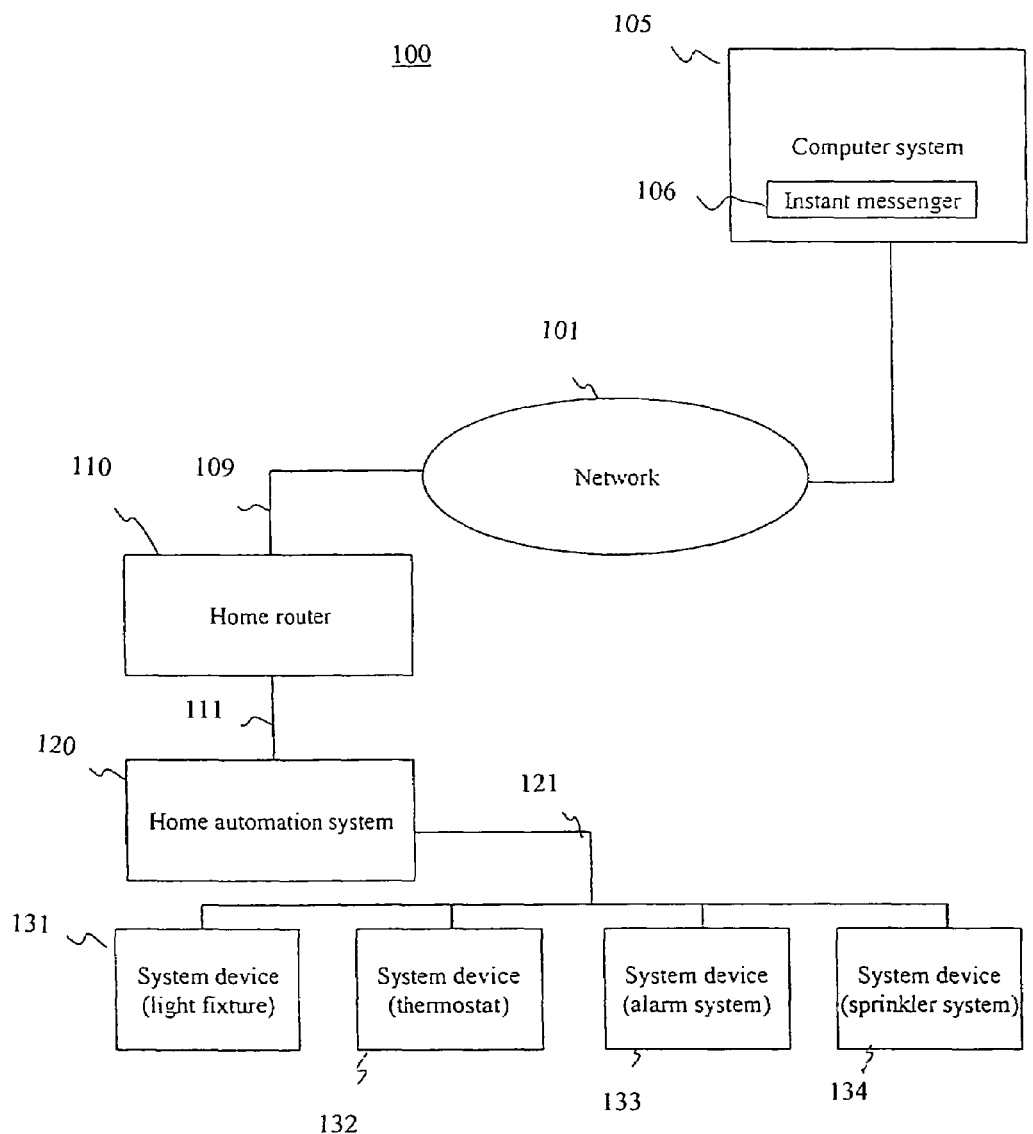
FIG. 1 shows a home automation interface system in accordance with one embodiment of the present invention.

Referring now to FIG. 1, a system 100 accordance with one embodiment of the present invention is shown. As depicted in FIG. 1, system 100 shows a distributed computer network 101 operable for implementing digital communications. The network 101 is typically the Internet or an Internet based network (e.g., Intranet, Extranet, etc.). Network 101 implements communications between widely dispersed users and their respective computer systems. One such computer system 105 is shown. FIG. 1 also depicts a home router 110 connected to network 101 via a communications link 109. The home router 110 is connected to a home automation system 120 via a communications link 111. The home automation system 120 is coupled to control a plurality of home appliances, depicted in FIG. 1 as system devices 131-134. As shown in FIG. 1, the system devices 131-134 comprise typical home appliances such as, for example, light fixtures, thermostat, alarm system, sprinkler system, etc.

The system 100 embodiment of the present invention is implemented as a router based interfacing method for a home automation system. In this embodiment, the router in 110 receives control signals from an instant messenger application 106 via the communications network 101 (e.g., the Internet, intranet, etc.). The router 110 then transmits the control signal the appropriate one or more of the appliances 131-134 (e.g., light fixture, alarm system, thermostat, etc.) to control the appliance in accordance with the control signal. A reply to the control signal can be received from the appliance and the reply can be transmitted to the instant messenger application 106 regarding a status of the appliance (e.g., "front porch light fixture 131 is on", etc.). The control signals can be transmitted among the appliances in accordance with a standardized home automation interface, as implemented by communications link 121 (e.g., a communications bus controlled by home automation system 120).

In the present embodiment, that router 110 is configured to interface with the appliances 131-134 via a home automation system interface unit, home automation system 120. Accordingly, the communications protocols, formats, procedures, etc., are in accordance with the specific standards of the home automation system interface unit 120.

In one embodiment, the home automation system 120 and the communications link 121 are in accordance with a CM11A™ device from X10™. Communications link 111 between router 110 and the home automation system 120 is configured to function in accordance with widely used X10™ communications standards. In this embodiment, the router 110 interfaces with a specialized X10™ device, the CM11A™ (e.g., home automation system interface unit 120), which acts as a transceiver for remotely controllable system devices 131-134 (e.g., light fixtures, alarm system, etc.). In this embodiment, the communications link 121 is a powerline based communications link. In this embodiment, router 110 can be configured to connect to home automation system 120 through, for example, a console port which functions as a serial port. The router 110 sends control signals to the home automation system 120, for example, to turn on or turnoff light fixture 131, turn on or turnoff or otherwise configure alarm system 133, and the like. The home automation system 120 relays the control signals from the router 110 to the appropriate device. Additionally, event notifications (e.g., the alarm system detecting motion or an unauthorized opening of a door or window) are relayed from the devices 131-134 back to the home router 110 via the home automation system 120.

In the present embodiment, the router 110 is configured to function as an instant messenger client to receive control signals from a user (e.g., from instant messenger 106). For example, the router 110 can function as an instant messenger client by logging onto an instant messenger server (not shown). In this case, if the router is in the same peer group as another person, the router will appear as a "friend" or "buddy" inside that person's instant messenger software (e.g., instant messenger 106). This makes it very easy for that person to send instant messages to the router to control the connected appliances (e.g., system devices 131-134) and to receive event notifications and other types of messages from them.

An example scenario is now described. Considering a case where the router 110 receives an event notifications from home automation system 120 (e.g., motion detected in the garden by alarm system 133), the router 110 will immediately send an instant message to a specified user who is currently logged onto the instant messenger service (e.g., instant messenger 106). That person will be notified via his computer system with a message saying, for example, "Garden Sensor has turned on". The person can then immediately send an instant message back to the router 110 to, for example, turn on the alarm. The message sent can be, for example, "controller turn on alarm". The router would interpret this pseudo-English command and send the appropriate control signals to the home automation system unit 120 (e.g., CM11A™) to turn on the alarm system device 133.

In this manner, the use of an instant messenger application and implementation of instant messenger functionality provides an easy to use and easy to understand interface for controlling an automation system. Instant messenger applications are device independent with respect to different types of computer systems (e.g., different desktop computer systems, different palmtop computer systems, cell phones, etc.). Additionally, the instant messenger functionality provides for easy remote access and control of the functions of the automation system.

Other advantages are provided in comparison to the prior art. For example, a user who uses a desktop PC based application as the home automation system controller must leave the PC on all the time if the user wants to monitor the house continuously. PC-based applications are also notoriously unreliable (e.g., crashes, etc.). In contrast, in most normal situations, a home router (e.g., home router 110) is on continuously, is extremely reliable, and consumes little power. When the router functions as the home automation system controller, there is no extra power used and any desktop PC in the home can be turned off. Additionally, by using Instant Messaging, the user can get notified of events anywhere in the world where he can log on to the Instant Messenger (even through firewall). The notification is immediate and the interface is very user friendly.

It should be noted that instant massaging and instant messenger applications as used herein refer to well known computer conferencing using, for example, the keyboard of a computer system, typically between two or more people. Instant messaging typically requires that both parties be online at the same time. Buddy lists or friends lists typically comprise names of people one may want to instant message. When any of those individuals log on, one is "instantly" notified so that instant messages can be passed or an interactive chat session can begin. AOL Instant Messenger (AIM)™, Microsoft Network Messenger Service (MSNMS)™, ICQ™ and Yahoo! Messenger™ are the major instant messaging services. When logged onto an Instant Messenger service, router 110 appears, and can send and received messages, in a manner similar to any other party on an individual's buddy list or friends list.

Figure 2:
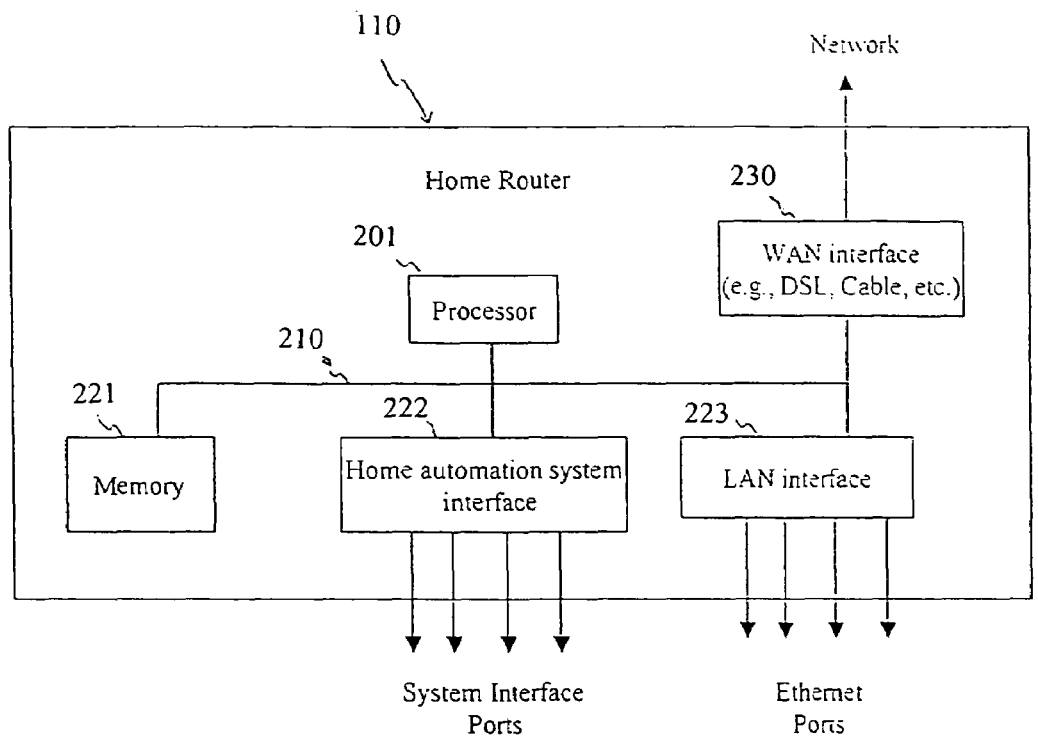
FIG. 2 shows a diagram of internal components of a home router in accordance with one embodiment of the present invention.

FIG. 2 shows a diagram of internal components of the home router 110 in accordance with one embodiment of the present invention. As depicted in FIG. 2, the home router 110 includes a processor 201 coupled to a memory 221, a home automation system interface 222, a LAN interface 223, and a WAN and interface 230 via a bus 210.

Embodiments of the present invention are implemented as a router 110 having a computer system platform for implementing the interface functionality in addition to conventional routing functions. In this embodiment, the router 110 includes the WAN interface 230 for communicating with the communications network (e.g., the Internet, intranet, etc.). The WAN interface 230 is typically configured to function with some form of broadband device (e.g., DSL modem, cable modem, ISDN, etc.). Conventional router functionality is provided via the Ethernet ports of the LAN interface 223. The home automation system interface 222 is configured for communicating with a home automation system (e.g., the home automation system unit 120 shown in FIG. 1). The home automation system interface 222 is configured to communicate with standardized protocols of the home automation system (e.g., CM11A™ device from X10™, or the like). The router also includes a computer system for executing computer readable code, which, in addition to implementing the normal router functionality (e.g., packet forwarding, packet routing, QoS, etc.), implements the home automation system interfacing functionality. The functionality is implemented, for example, by processor 201 executing software stored in computer memory 221.

The router 110 can be configured via software, for example, to log onto an instant messenger server and function as an instant messenger client to receive the control signals for the appliances. Software can also configure the router 110 to receive event signals from one or more appliances and transmit messages to the instant messenger application regarding the event signals. Similarly, the router can also be configured to maintain a firewall and securely transmit and receive messages to and from the instant messenger application through the firewall wall.

Figure 3:
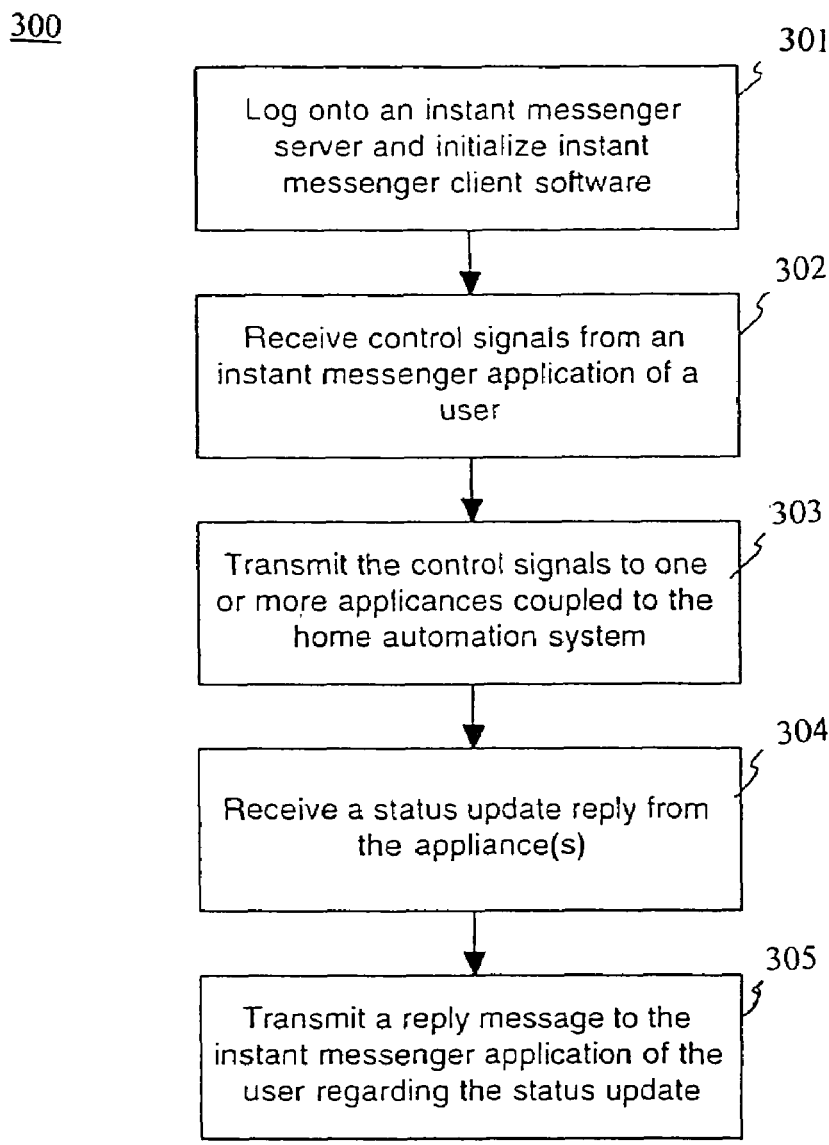
FIG. 3 shows a flowchart of the steps of a home automation system interface and control process in accordance with one embodiment of the present invention.

Referring now to FIG. 3, a flowchart of the steps of a process 300 in accordance with one embodiment of the present invention. As depicted in FIG. 3, process 300 shows the steps involved in an interface and control process implemented using a router in accordance with one embodiment of the present invention (e.g., router 110).

Process 300 begins in step 301, where a router (e.g., router 110) logs onto an instant messenger server and initializes instant messenger client software. As described above, the log on process provides notification to the one or more users that the router is online and ready to process commands. In step 302, control signals from an instant messenger application of a user are received by the router. The router functions as a broadband gateway for the home (e.g., via DSL, cable modem, ISDN or the like). Accordingly, the router also hosts security functions for the home such as a fire wall, address translation, and the like. The initialization process configures the security functions to work with the incoming and outgoing messages and signals.

In step 303, the received control signal is transmitted to the appropriate one or more appliances coupled to the home automation system. In one embodiment, the router is configured to interface with a standardized home automation system controller (e.g., unit 120 shown in FIG. 1) to facilitate communication and control of the coupled appliances. In step 304, a status update message is received from the appliance(s). Once the appliance receives the control signal and configures itself accordingly, a status update message is transmitted back to the router (e.g., "porch light is now on"). Subsequently, in step 305, the reply message is transmitted to the instant messenger application of the user, thereby informing the user of the new status of the appliance.

Computer System Environment

Figure 4:
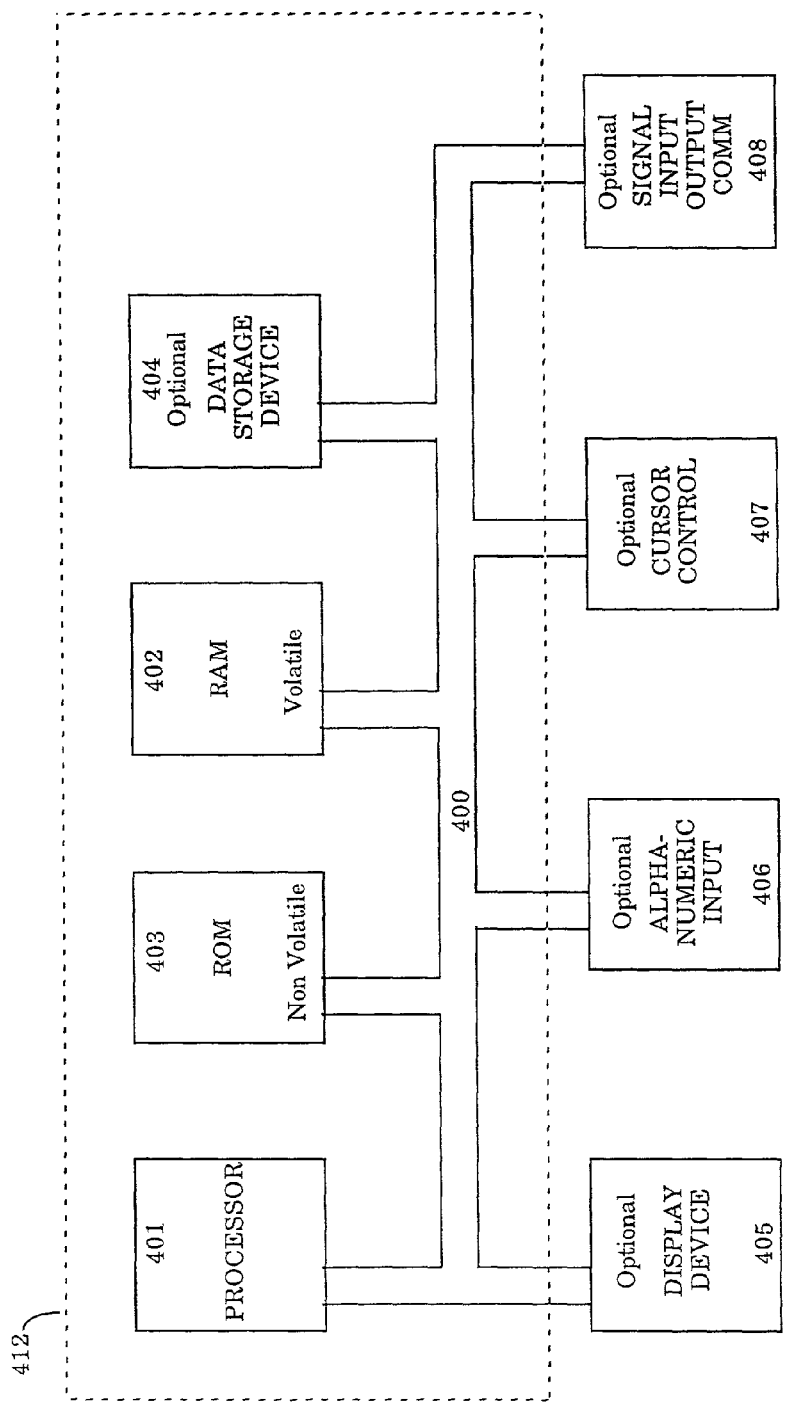
FIG. 4 shows the general components of a computer system execution environment in accordance with one embodiment of the present invention.

Referring to FIG. 4, a computer system 412 is illustrated. As described in the above discussions of the present invention, certain processes and steps are discussed that are realized, in one embodiment, as a series of instructions (e.g., a software program, software code, etc.) that reside within a computer readable memory of system 412 and are executed by one or more processors of system 412. When executed, the instructions cause computer system 412 to perform the specific functions and exhibit the specific behavior which was described in detail above.

Specific aspects of the present invention are operable within a programmed computer system which can function as IP network device, such as a home router, broadband router, IP gateway, or implement the functionality of a client or server machine, such as a desktop computer system (e.g., a PC) or a palm top computer system (e.g., a PDA). A generalized example of such a computer system operable to implement the elements and functions of the present invention is shown in FIG. 4.

In general, the computer system 412 of the present invention includes an address/data bus 400 for communicating information, one or more central processor(s) 401 coupled with bus 400 for processing information and instructions, a computer readable volatile memory unit 402 (e.g., random access memory, static RAM, dynamic RAM, etc.) coupled with bus 400 for storing information and instructions for the central processor(s) 401, a computer readable non-volatile memory unit 403 (e.g., read only memory, programmable ROM, flash memory, EPROM, EEPROM, etc.) coupled with bus 400 for storing static information and instructions for processor(s) 401. System 412 can optionally include a mass storage computer readable data storage device 404, such as a magnetic or optical disk and disk drive coupled with bus 400 for storing information and instructions. Optionally, system 412 can also include a display device 405 coupled to bus 400 for displaying information to the computer user, an alphanumeric input device 406 including alphanumeric and function keys coupled to bus 400 for communicating information and command selections to central processor(s) 401, a cursor control device 407 coupled to bus for communicating user input information and command selections to the central processor(s) 401, and a signal input/output device 408 coupled to the bus 400 for communicating messages, command selections, data, etc., to and from processor(s) 401.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the Claims appended hereto and their equivalents.

What is claimed is:

1. A system comprising:
  a router having a Local Area Network (LAN) interface for coupling to one or more general purpose computers located in a private home network, the router configured to perform address translation on packets exchanged between the general purpose computers located in the private home network and a wide area network;
  the router having a home automation interface for coupling to one or more remote home appliances, the home automation interface separate from the LAN interface and configured to communicate with the remote home appliances using a home automation protocol;
  the router configured to send one or more communications over the wide area network for logging into an instant messenger application as a client in response to receiving an event signal from one of the home appliances, the router logging into the instant messenger application as the client independently of the general purpose computers and regardless of whether all general purpose computers located in the private home network are deactivated;
  the router configured to notify a user of the event signal using the instant messenger application; and the router configured to control the appliance that sent the event signal according to an instant message received over the wide area network.

2. The system of claim 1 further comprising:
a home automation management apparatus coupled to the router over the home automation interface; and
the router configured to use the home automation protocol to transmit a control signal to the home automation management apparatus, the control signal for causing the home automation management apparatus to control the home appliance that sent the event signal.

3. The system of claim 1 wherein the home automation interface is an X10 interface and the home automation protocol is an X10 protocol.

4. The system of claim 1 wherein the router controls a light fixture, a thermostat, an alarm system or a sprinkler system according to the instant message.

5. The system of claim 1 wherein the router appears as an instant messenger friend on a graphical display on a remote endpoint located outside the private home network after the router logs into the instant messenger application.

6. The system of claim 1 wherein the router is further configured to interpret pseudo-English commands included in the instant message and control the home appliance that sent the event signal according to the interpreted pseudo-English commands.

7. An apparatus comprising:
a network interface coupled to one or more computers located in a first network;
an appliance automation interface for coupling to at least one appliance, the appliance automation interface separate from the network interface;
one or more processors; and
a memory coupled to the processors comprising instructions executable by the processors, the processors operable when executing the instructions to:
forward communications between the first network and a second different network to provide the computers that are located in the first network with access to the second network;
send signaling messages over the second network for logging into an instant messenger application in response to receiving an event signal received over the appliance automation interface, the signaling messages sent independently of whether any computers located in the first network are powered on;
send one or more outgoing instant messages over the second network to notify a user of the event signal using the instant messenger application; and
control the appliance through the appliance automation interface according to one or more incoming instant messages received over the second network.

8. The apparatus of claim 7 wherein the processors are further operable to transmit the control signal to the appliance in accordance with a standardized home automation protocol.

9. The apparatus of claim 7 wherein the processors are further operable to interface with the appliance via a remote home automation system interface unit configured to control the appliance, the interfacing conducted in accordance with a standardized home automation protocol.

10. The apparatus of claim 9 wherein the home automation system interface unit is a transceiver configured to control the appliance.

11. The apparatus of claim 7 wherein the processors are further operable to communicate with the appliance over the appliance automation interface using an X10 protocol.

12. A system comprising:
means for transferring communications using a network interface of a router, the communications transferred between a first network and a second network to provide one or more computers located in the first network with access to the second network;
means for logging the router into an instant messenger application server by sending login messages over the second network; and
means for controlling an appliance using the router by sending control signals over an appliance automation interface of the router, the control signals configured according to incoming messages that are both received over the second network and generated by a user in communication with the instant messenger application server.

13. The system of claim 12 wherein the control signals are sent in accordance with a standardized home automation protocol.

14. The system of claim 12 further comprising:
means for communicating with the appliance via a home automation system interface unit configured to control a plurality of appliances.

15. The system of claim 14 wherein the home automation system interface unit is a transceiver configured to control the plurality of appliances.

16. The system of claim 12 wherein the router functions as an instant messenger client when receiving the incoming messages.

17. The system of claim 12 wherein the first network is a private home network and the second network is a wide area network.

18. A method comprising:
forwarding communications between a first network and a second network to provide one or more computers located in the first network with access to the second network, said communications forwarded using a router;
sending login messages over the second network to an instant messenger application server, said login messages sent using the router, said sending of the login messages occurring independently of the operational status of all computers located in the first network;
controlling an appliance according to one or more incoming messages received by the router over the second network, the appliance controlled using the router and without using any of the computers located in the first network.

19. The method of claim 18 further comprising:
controlling the appliance through a standardized home automation interface of the router.

20. The method of claim 18 further comprising:
interfacing with the appliance via a home automation system interface unit configured to control a plurality of appliances, the interfacing conducted in accordance with a standardized home automation protocol.

21. The method of claim 20 wherein the home automation system interface unit is a transceiver configured to control the plurality of appliances.

22. The method of claim 18 further comprising:
logging the router onto the instant messaging application server; and
wherein the incoming messages are instant messages sent to the router.

* * * * *